J. KEITH.
Domestic Boiler.

No. 97,519.  Patented Dec. 7, 1869.

Witnesses:  Inventor:

United States Patent Office.

J. KEITH, OF BROOKLYN, NEW YORK.

Letters Patent No. 97,519, dated December 7, 1869.

DETACHABLE TIPPING-BAIL.

The Schedule referred to in these Letters Patent and making part of the same.

*To all whom it may concern:*

Be it known that I, J. KEITH, of Brooklyn, in the county of Kings, and State of New York, have invented a new and useful Improvement in Tipping-Device; and I do hereby declare that the following is a full, clear, and exact description thereof, which will enable others skilled in the art to make and use the same, reference being had to the accompanying drawings, forming part of this specification.

This invention relates to a new and useful improvement in a device for tipping pots and kettles, for facilitating the operation of pouring out the contents, and consists in a bail connected with a hoop or band, by which the pot or kettle is surrounded, arranged and operating as hereinafter more fully described.

In the accompanying drawing—

Similar letters of reference indicate corresponding parts.

Figure 2:
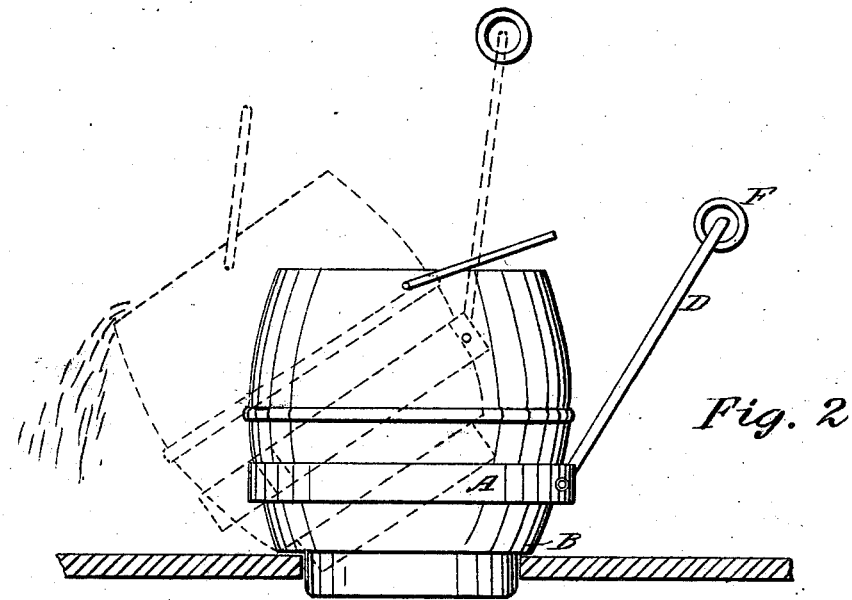
Figure 2 represents it as when attached to a pot or kettle on a stove; also, showing it as when in use. In the latter position, the pot and tipping-device are shown in red color.
Figure 1:
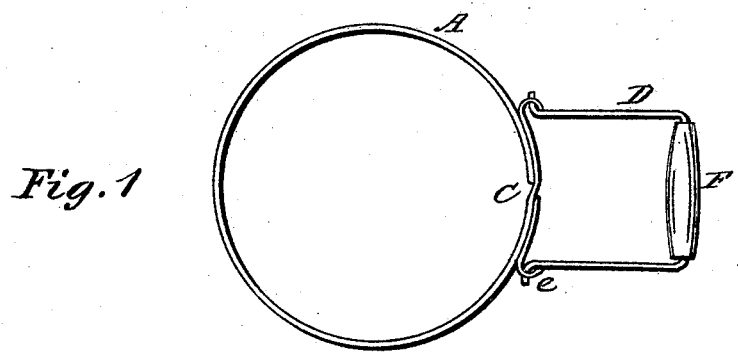
Figure 1 represents a top view of the device.

A is a hoop or band, which is made so as to fit on to a pot or kettle above the shoulder B, as seen in fig. 2.

This hoop A may be made in different ways, but I prefer to make it of a single piece, and lock it together, as seen at C, allowing the ends to extend each way, to form ears for the bail D.

*e* represents the ears, which are turned so as to come in contact with the bail, and to act as springs against the bail, causing sufficient friction thereby to prevent the handle or bail from falling, and to keep it in about the position seen in fig. 2, when it is not in actual use.

F is the handle, which is of wood, or some other good non-conductor of heat, so that it never gets too hot for the hand.

In using the tipping-bail, which is attached to the pot by slipping or driving on the band A, the pot or kettle is lifted by the common bail, in the ordinary manner, and carried to the desired location for emptying its contents; then, by lifting with the other hand the tipping-bail, the pot or kettle is tipped, without the least difficulty or danger, until the contents are entirely discharged.

One tipping-device, constructed, as shown, of the hoop A and bail D, is sufficient for all pots and kettles which it will fit, as it is readily detached from one and applied to another, or there may be a tipping-bail attached permanently to each pot or kettle.

This tipping-device may be made to slip on to a pot or kettle below the shoulder B, after the pot or kettle has been lifted from the fire or stove, but I do not recommend that method as being as safe and convenient as that shown in the drawing.

The advantages of this device are that the operation of discharging the contents of the pot or kettle is greatly facilitated thereby, no looking for rags or holders being necessary, while all danger of spilling the contents and scalding the person is avoided.

Having thus described my invention,

I claim as new, and desire to secure by Letters Patent—

1. A detachable tipping-device, formed of the hoop or band A and bail D, substantially as and for the purposes described.

2. The spring-ears *e*, in combination with a tipping-bail, substantially as and for the purposes described.

The above specification of my invention signed by me, this 5th day of August, 1869.

J. KEITH.

Witnesses:
GEO. W. MABEE,
ALEX. F. ROBERTS.